UNITED STATES PATENT OFFICE.

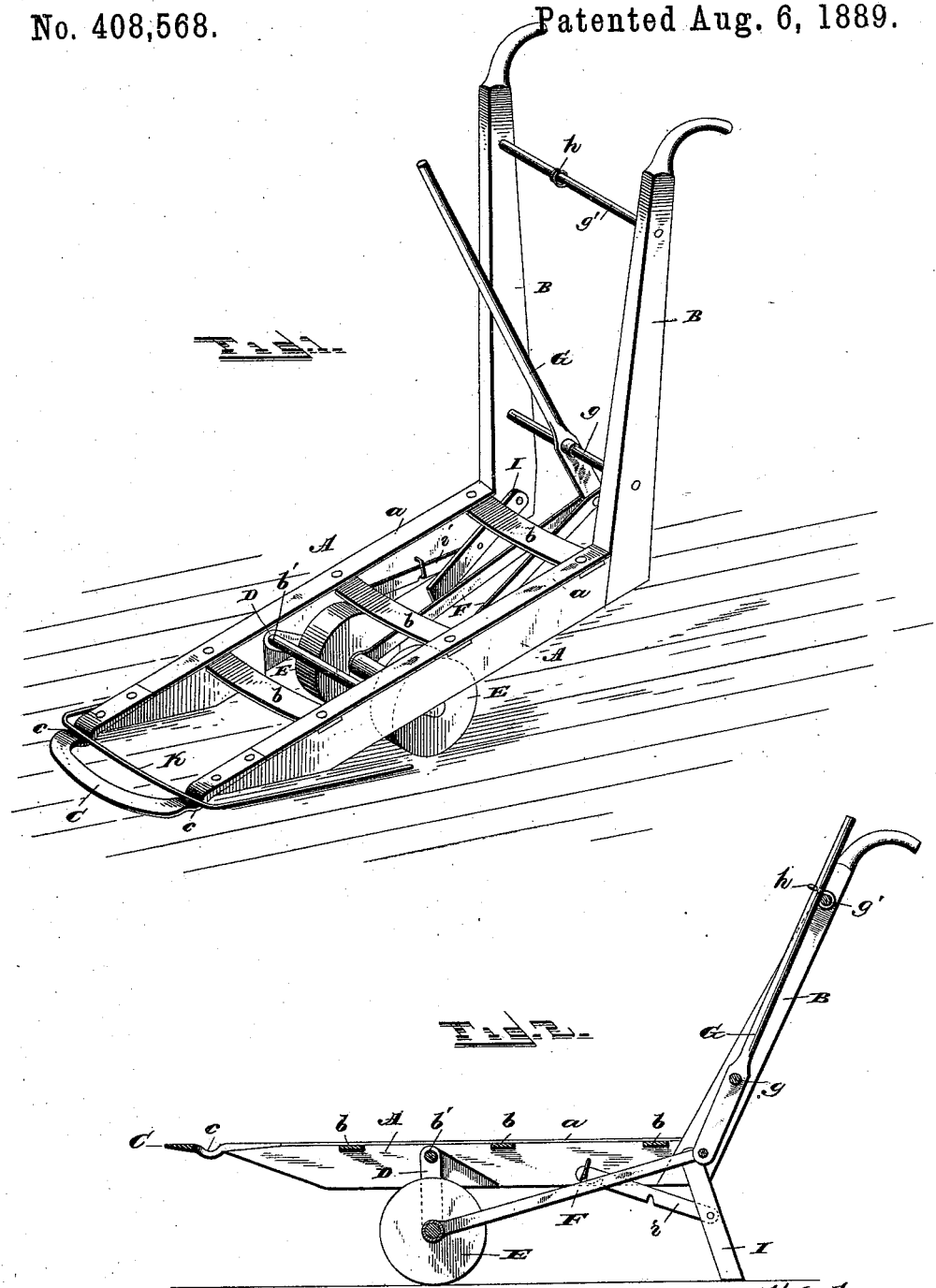

GEORGE W. AMOS, OF BURLINGAME, KANSAS.

STOVE-TRUCK.

SPECIFICATION forming part of Letters Patent No. 408,568, dated August 6, 1889.

Application filed May 25, 1889. Serial No. 312,108. (No model.)

*To all whom it may concern:*

Be it known that I, GEORGE W. AMOS, a citizen of the United States of America, residing at Burlingame, in the county of Osage and State of Kansas, have invented certain new and useful Improvements in Stove-Trucks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain new and useful improvements in stove-trucks and attachments therefor; and it consists in the special construction of a truck provided with handles to which a frame is rigidly attached, said frame carrying pivoted supporting-legs and rollers, the rollers being connected to a lever pivoted between the handles for elevating or lowering the frame, as will be hereinafter fully set forth.

My invention also consists in providing a bail adapted to be carried by the forward end of the truck and operated by the truck to hold one end of the stove raised.

The novel features of the truck will be hereinafter described and particularly claimed.

In the accompanying drawings, Figure 1 is a perspective view of a stove-truck constructed in accordance with my invention, the parts being arranged in position for inserting the same under a stove or other object to raise it. Fig. 2 is a longitudinal sectional view.

A refers to the side pieces of the body of the truck and are provided at their ends with handles B B. The side pieces are provided on their upper edges with metallic strips $a\,a$, and are connected to each other by cross-bars $b\,b$, which are curved slightly downward. The forward ends of the side pieces A A are connected to each other by a cross-piece C, the forward part of which is curved and tapered as shown. This cross-piece C, adjacent to the ends of the side pieces A A, is bent downwardly to form recesses $c\,c$, in which the cross-piece of the bail may lie.

At about the center of the body of the truck is rigidly secured a rod $b'$, upon which are loosely hung links D D, an axle being journaled to the opposite ends of said links, upon which are mounted rollers E E and the ends of connecting-rods F, the opposite ends of these connecting-rods being pivotally connected to the lower end of a lever G, said lever being pivoted upon a rod $g$. The upper ends of the handle-bars are connected by a rod $g'$, which carries a hook $h$, adapted to be thrown into engagement with the upper end of the lever G, when it is desired to hold the truck elevated, as shown in Fig. 2. When it is desired the rollers should lie well under the truck to lower the same, as shown in Fig. 1, the lever G is released and thrown forward.

To the lower ends of the handle-bars B B are pivoted legs I I, which are provided with braces $i\,i$, the front ends of which pass through staples or guides, the said braces having notches which engage with the staples for holding the legs either within the frame or extended, as shown in Fig. 2.

The bail K is made up of a bar of metal of sufficient rigidity, bent U-shaped, the cross-piece thereof lying within the recesses $c\,c$. When it is desired to place a stove or other object upon the truck, the bail is placed over the forward end of the truck within the recesses $c\,c$, the parts of the truck being in the position shown in Fig. 1. The forward end of the truck, with the bail, is then shoved partially under the stove, and by tilting the truck one side of the stove will be raised and the bail will support the stove or other object in an inclined position, after which the truck may be shoved completely under the stove and by elevating the same slightly the bail will be displaced and the weight of the stove rest upon the frame of the truck. Then by operating the lever G the wheels can be thrown forward and the stove easily carried by the truck. When it is desired the stove should rest upon the truck, the legs may be let down.

I am aware that prior to my invention trucks have been provided with wheels which could be raised and lowered by employing suitable mechanism, and I do not claim such construction, broadly; but

What I claim as new, and desire to secure by Letters Patent, is—

1. In a truck, for the purpose set forth, the frame or side pieces A A, having handles B B rigidly secured thereto, rollers mounted on an axle connected to the side pieces by links D D, and with the lower end of a pivoted lever by connecting-rods F F, the said lever being pivoted between the handle-bars, and means for securing the lever in place between the handle-bars, substantially as shown, and for the purpose set forth.

2. The combination, in a truck, for the purpose set forth, of the side pieces A A, connected to each other at their forward ends by a cross-piece C, having recesses c c, whereby the truck is adapted to be used in connection with a U-shaped bail, substantially as and for the purpose set forth.

3. The combination, in a stove-truck constructed substantially as shown and provided at its forward end with recesses or indentations, of a bail K, having a curved central portion and end members which extend at right angles from the central portion, said members being of a greater width or distance from each other than the outer edges of the side frame, substantially as shown.

4. In combination with a truck, the frame A, having rollers pivotally connected thereto, and a lever connected with the axle of said rollers, said lever being pivoted between the handles, pivoted legs I I, having notched braces i i, said braces passing through staples or guides, substantially as and for the purpose set forth.

In testimony whereof I affix my signature in presence of two witnesses.

GEORGE W. AMOS.

Witnesses:
W. B. DAVIS,
E. F. CHARLTON.